(12) United States Patent
Camenisch et al.

(10) Patent No.: US 7,543,139 B2
(45) Date of Patent: Jun. 2, 2009

(54) REVOCATION OF ANONYMOUS CERTIFICATES, CREDENTIALS, AND ACCESS RIGHTS

(75) Inventors: Jan Camenisch, Rueschlikon (CH); Anna Lysyanskaya, Providence, RI (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/325,790

(22) Filed: Dec. 19, 2002

(65) Prior Publication Data

US 2003/0177352 A1 Sep. 18, 2003

(30) Foreign Application Priority Data

Dec. 21, 2001 (EP) ................... 01811262

(51) Int. Cl.
*H04L 9/00* (2006.01)
(52) U.S. Cl. .................................................. 713/156
(58) Field of Classification Search ............... 380/277; 713/156

See application file for complete search history.

(56) References Cited

U.S. PATENT DOCUMENTS

| | | | |
|---|---|---|---|
| 5,659,616 A | * | 8/1997 | Sudia .......................... 705/76 |
| 5,699,431 A | * | 12/1997 | Van Oorschot et al. ........ 380/30 |
| 6,044,462 A | * | 3/2000 | Zubeldia et al. ............. 713/158 |
| 6,516,316 B1 | * | 2/2003 | Ramasubramani et al. ..... 707/9 |
| 6,775,782 B1 | * | 8/2004 | Buros et al. .................... 726/2 |

* cited by examiner

*Primary Examiner*—Emmanuel L Moise
*Assistant Examiner*—Ali S Abyaneh
(74) *Attorney, Agent, or Firm*—Cantor Colburn LLP; Lisa Yamonaco

(57) ABSTRACT

In accordance with the present invention, there is given methods, systems and apparatus for revoking a derived credential formed from an initial credential and an indication value within a network. An example method comprises the steps of: updating an accumulator value based on a plurality of user credential keys where each user credential key is associated with a user device entitled to the derived credential; providing public information that comprises a public key for verifying the initial credential and the accumulator value; an entity receiving from a user device derived-credential information comprising an initial-credential information and an indication-value information indicating that the user credential key is inherently included in the accumulator value, and request information; and, processing the request information in response to verifying by the entity that the initial-credential information and the indication-value information are valid.

9 Claims, 3 Drawing Sheets

US 7,543,139 B2

REVOCATION OF ANONYMOUS CERTIFICATES, CREDENTIALS, AND ACCESS RIGHTS

FIELD OF THE INVENTION

The present invention relates to providing and revoking a derived credential within a network. More particularly, the invention relates to a scheme to obtain revocation for anonymous group-membership certificates and anonymous credentials.

BACKGROUND OF THE INVENTION

Today, many companies offer information and products via web sites. In many cases, a registration or subscription is required in order to access those sites. Suppose a set of users is granted access to a resource or service. This set changes over time: some users are added, and for some, the access to the resource or service is revoked. When a user is trying to access the resource, some verifier must make sure that this user is in this set. The immediate solution is to have the verifier look up a user in some database to make sure that a user is still allowed access to the resource in question. This solution is expensive in terms of communication. Another approach is of certificate revocation chains, where every day eligible users get a fresh certificate of eligibility. This is somewhat better since the communication burden is now shifted from the verifier to the user, but still suffers the drawback of high communication costs, as well as the computation costs needed to reissue certificates. Moreover, it disallows revocation at arbitrary time as need arises. A satisfactory solution to this task could not been provided, especially in a situation where the users in a system are anonymous at access time.

Accumulators were introduced by J. Benaloh and M. de Mare in their article "One-way accumulators: A decentralized alternative to digital signatures", In Tor Helleseth, editor, Advances in Cryptology—EUROCRYPT '93, volume 765 of LNCS, pages 274-285, Springer-Verlag, 1994, as a way to combine a set of values into one short accumulator, such that there is a short witness that a given value was incorporated into the accumulator. Extending the ideas due to Benaloh and de Mare, N. Baric and B. Pfitzmann provided in their article "Collision-free accumulators and fail-stop signature schemes without trees", In Walter Fumy, editor, Advances in Cryptology—EUROCRYPT '97, volume 1233 of LNCS, pages 480-494. Springer Verlag, 1997, a construction of the so-called collision-resistant accumulators, based on the strong RSA assumption. A handy property of accumulators as defined in the papers cited, is that the values can be added one-by-one at unit cost. However, the deletion of a value from an accumulator can not be made independent of the number of accumulated values.

From the above follows that there is a call for an efficient mechanism for granting and revoking privileges, e.g., access rights. The revocation of a membership or subscription should be easily possible with a minimum of computation and communication costs.

SUMMARY AND ADVANTAGES OF THE INVENTION

In accordance with the present invention, there is given a method for revoking a derived credential formed from an initial credential and an indication value within a network, the method comprising the steps of: updating an accumulator value based on a plurality of user credential keys where each user credential key is associated with a user device entitled to the derived credential; providing a public information that comprises a public key for verifying the initial credential and the accumulator value; receiving by an entity from a user device a derived-credential information comprising an initial-credential information and an indication-value information indicating that the user credential key is inherently included in the accumulator value, and request information; and, processing request information in response to verifying by the entity that the initial-credential information and the indication-value information are valid.

The above method shows the advantage that the deletion of one or more values, i.e. user credential keys, from the accumulator value can be performed independent of the number of accumulated values. Better still, once the accumulator value is updated, the verification or proof that a given value or user credential key is in the accumulator value (provided that this value or user credential key has not been revoked) can be done without any trapdoor information at unit cost. No revocation lists are necessary. Hence, the method is attractive to applications of granting and revoking privileges, e.g., access rights.

The method can be performed efficiently by using the accumulator value that is provided by a one-way accumulator, hereafter short accumulator. The accumulator facilitates or combines several values of user credential keys to one single value, the accumulator value. Thereby the order of the user credential keys has no relevance. Indeed, using accumulators in combination with zero-knowledge proofs in the validation step allows to prove that a committed value, i.e. the indication value with the user credential key, is in the accumulator.

The method also works efficient for revoking group membership for group-signature schemes and for credential revocations in credential systems. For that the public key for the accumulator is incorporated into the group manager's or organization's public key, and the secret trapdoor of the accumulator into the corresponding secret key. Each time a user joins the group, i.e. obtains a credential, the group manager or organization gives her a membership certificate or credential certificate. An integral part of this certificate is a certificate key e. This will be the value added to the accumulator when the user is added, and deleted from the accumulator if the user's privileges have to be revoked. This provably secure mechanism does not add any significant communication or computation overhead.

It is possible to connect beforehand the user device to a credential-granting service, e.g. a subscription service, by sending an activation information to obtain the initial credential and the indication value in order to establish an access-right. From the initial credential and the indication value the derived-credential information can be formed. Moreover, it is also possible to connect the user device prior to the connection of the credential-granting service to a registration service, e.g. a certification authority, by sending a credential request information. The user device receives then a registration information that can be used to obtain the access information at the subscription service.

The credential-granting service and the entity can be integrated in a unitary entity. Moreover, the credential-granting service and the entity can be part of the service. By doing so, the infrastructure can be simplified considerably.

The step of updating the accumulator value can comprise replacing the accumulator value by an updated accumulator value. This shows the advantage that the updated accumulator value includes after the update only currently valid user credential keys. The updated accumulator value can be provided by the credential-granting service. Generally, the public information comprising the public key for verifying the initial credential and the accumulator value is publicly available by, e.g., a public directory service.

The user device can obtain, i.e. request or receive, an accumulator change value that is provided publicly available. From the accumulator change value the user entity can derive a new indication value that replaces the indication value and is easily usable in the verification step to prove the validity of the new indication value.

The verifying step can comprise using the public key for verifying the initial-credential information and the accumulator value for verifying the indication-value information. This has the advantage that verification does not depend on the number of current members or deleted members, as it would be the case, e.g., when using a certificate revocation list (CRL).

In another aspect of the present invention, there is provided a system for providing a derived credential formed from an initial credential and an indication value and for revoking the derived credential within a network, the system comprising a user device connectable to a credential-granting service and an entity, the credential-granting service having an update unit for an accumulator value based on a plurality of user credential keys where each user credential key is associated with one user device entitled to the derived credential, the credential-granting service providing a public information having a public key for verifying the initial credential and the accumulator value, wherein the update unit is adapted to update the accumulator value by an accumulator so as to include currently valid user credential keys, the user device is adapted to send a derived-credential information comprising an initial-credential information and an indication-value information indicating that the user credential key is inherently included in the accumulator value, and request information, and the entity is adapted to process the request information in response to a verification that the initial-credential information and the indication-value information are valid.

DESCRIPTION OF THE DRAWINGS

Preferred embodiments of the invention are described in detail below, by way of example only, with reference to the following schematic drawings.

Figure 1:
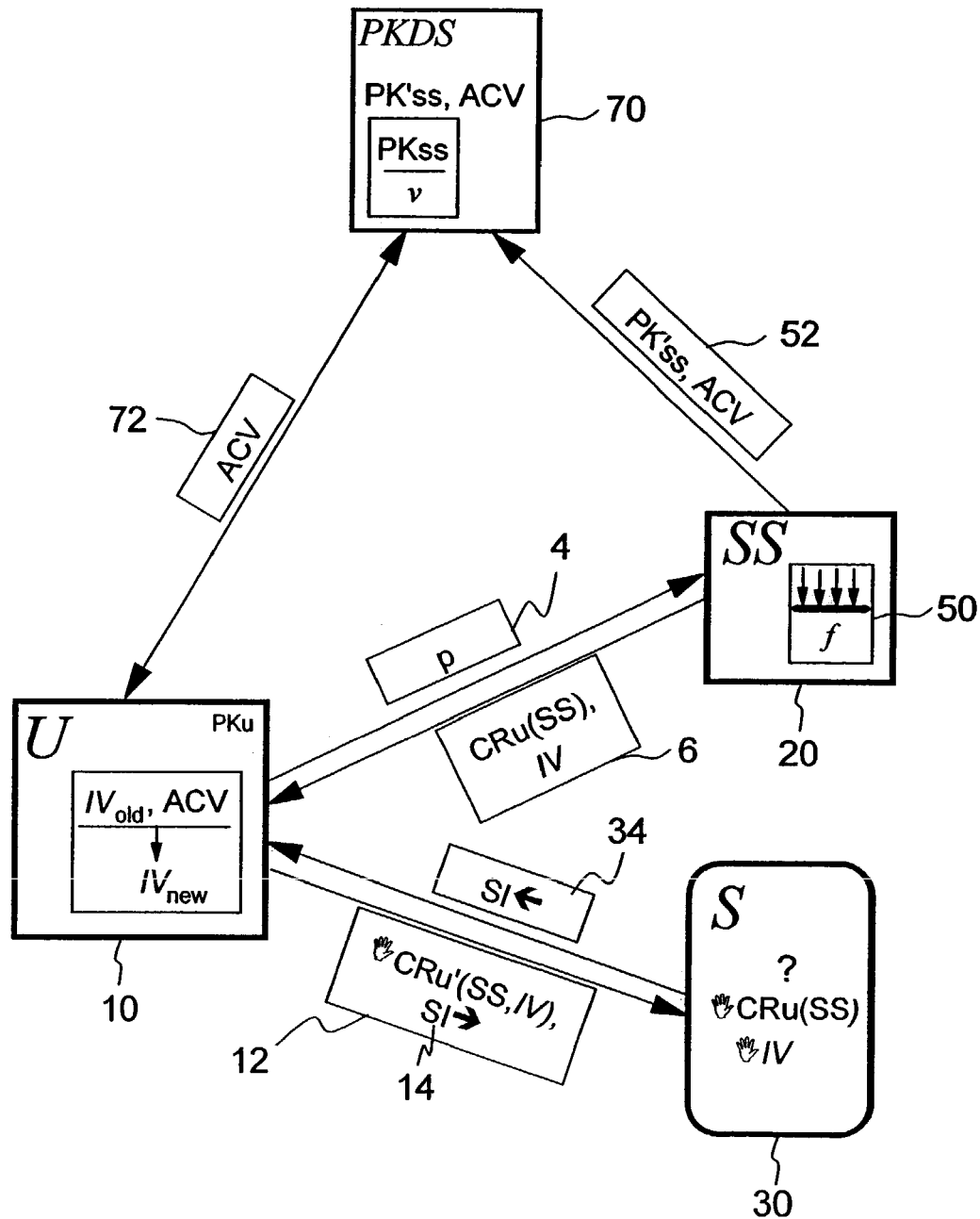
FIG. 1 shows a schematic illustration of a first embodiment according to the present invention.

The drawings are provided for illustrative purpose only and do not necessarily represent practical examples of the present invention to scale.

GLOSSARY

The following are informal definitions to aid in the understanding of the description.

Credential: In the present context, the term credential is a subset of access permissions (developed with the use of media-independent data) attesting to, or establishing, the identity of an entity, such as a birth certificate, driver's license, mother's maiden name, social security number, fingerprint, voice print, or other biometric parameter(s). Moreover, the credential comprises information, passed from one entity to another, used to establish the sending entity's access rights. The term certificate is understood as a particular credential stating that a certain public key belongs to a certain entity or user.

Credential CRu(AUTH): A credential is understood as a statement about a person or user U (pseudonym) signed by some authority AUTH, e.g. certification authority. The statement can be, for instance, this person or user U is allowed to drive a car, or this person or user U is eligible for a credit or to access a service.

User credential key: A value that is part of the credential and is unique for each credential issued by the same authority.

Credential show ʊCRu(AUTH): A credential show is a message that, depending on the system, comprises the credential CRu(AUTH) or a proof of possession of the credential CRu(AUTH).

The following symbols relate to the terms indicated beside each symbol, and are used within the description:

IV indication value

ʊIV indication-value information
CRU(SS) initial credential
CRu'(SS,IV) derived credential ʊCRu(SS) initial-credential information ʊCRu'(SS,IV) derived-credential information
PK public key
$PK_U$ user credential key
$PK_{Ux}$ user credential keys
$PK'_{SS}$ public information
$PK_{SS}$ public key
a, b, c, g, h quadratic residues modulo N
$a_f$ auxiliary information about $f$
$A_k$ polynomial-time adversaries
c commitment value
D delete algorithm
e first prime number
$e_i$ first prime number with index i
$e_j$ first prime number with index j
$E_{add}$ archive for storing values that correspond to added users
$E_{delete}$ archive for storing values that correspond to deleted users
$f$ accumulator providing accumulator value v or updated accumulator value v'
$f_n$ accumulator with index n
$\{F_k\}$ family of
φ Euler function
G probabilistic algorithm
k security parameter
m variable, polynomially bound by k
n, N RSA modulus
p second prime number
p' third prime number with p=2p'+1
q fourth prime number
q' fifth prime number with q=2q'+1
$Qr_n$ set of quadratic modulo n
r random value
$s_i$ secret value
u old value of indication value IV
u' new value of indication value IV
$u_i$ indication value for user $U_i$
$U_i$ user with index i
$U_f$ range of accumulator value
v accumulator value
v' new accumulator value or updated accumulator value
x secret key or value added to accumulator
$x_i$ secret key of user $U_i$ $x_1$ first secret key added to accumulator
$x_2$ second secret key added to accumulator
$X_m$ m-th secret key added to accumulator
x̃ value added or removed from accumulator
X set of values accumulated
$X_k$ domain of values that can be accumulated
$\{X_k\}$ family of domains
y old accumulator value
z part of credential
part of credential of user $U_i$

DESCRIPTION OF EMBODIMENTS

With general reference to the figures, the features of a method and system of providing a derived credential and of revoking the derived credential within a network are described in more detail below. The embodiment considers a credential as access information.

FIG. 1 shows a basic scenario that allows a user device 10, labeled with U and hereafter short user 10, having a user credential key $PK_U$ to anonymously access an entity 30, labeled with S. Such a user device can be any device suitable to perform actions and connect to a network, such as a computer, a handheld device, a mobile phone etc . . . It is assumed that the entity 30, labeled with S, is a subscription-based service 30, for instance, an archive service providing information, e.g. articles. The user 10 is connected to the entity 30. For the sake of simplicity, only one such service 30 is depicted in the figure whilst many of them are usually in the network. Moreover, the user 10 is connected to a credential-granting service 20, also referred to as subscription service and therefore labeled with SS, which can be a subscription server or host, and to a public directory service 70. The public directory service 70 is connected to the credential-granting service 20 and receives from the credential-granting service 20 a public information $PK'_{SS}$ and here an accumulator change value ACV. The credential-granting service 20 processes an accumulator value v by an accumulator f and comprises an update unit 50 for updating the accumulator value v and providing the accumulator change value ACV. The accumulator value v includes inherently a plurality of user credential keys $PK_{Ux}$ where each user credential key $PK_U$ belongs to at least one user 10 allowed to access the entity 30.

The connections are available via a network as it is known in the art, e.g. the Internet with anonymous routing. The arrows in the figure show the flow of information or messages sent, whereby the labeled boxes indicate those information. The connection from the user 10 to the credential-granting service 20 is usually used to initialize the method.

The user 10 initiates, e.g., a payment by sending an appropriate payment message 4, labeled with p, to the credential-granting service 20 as indicated by the arrow. This payment message 4 may include the wish to get an access right to use a particular service at the entity 30. This payment message 4 may also comprise an intended number or time frame for the accesses. In answer to the payment message 4, the user 10 receives access information 6, which here comprise an initial credential CRu(SS) and an indication value IV. The user 10 can derive from the initial credential CRu(SS) an initial-credential information ♥CRu(SS) and from the indication value IV an indication-value information ♥IV. From that the user 10 forms a derived-credential information ♥CRu'(SS, IV) which indicates that the user credential key $PK_U$ is inherently included in the accumulator value v processed by the credential-granting service 20. That means the user 10 can prove to the entity 30 that he is presently subscribed to the credential-granting service 20, i.e. he is currently a valid user and has the access-right to the entity 30. Of course, the access-right can be free of charge.

In the lower part of the figure it is indicated that the user 10 sends to the entity 30 a user request 12 comprising the derived-credential information ♥CRu'(SS,IV) and a request information 14, labeled with SI➡, which for example requests an article from a defined newspaper at the entity 30. The entity 30 is adapted to accent such a user request 12 provided that the initial-credential information ♥CRu(SS) and the indication-value information ♥IV are valid. The entity 30 therefore verifies the received information of the user request 12. Upon verification the entity 30 processes the request information 14 and retrieves the information in request, e.g., the requested article, as response-service information 34 and sends it to the user 10, as indicated by box 34 labeled with SI⬅.

In the following, the user 10 obtains, i.e. requests or receives, from the public directory service 70 an accumulator change value 72, labeled with ACV. This has the advantage that the user 10 does not need to contact the credential-granting service 20 again. In general, the credential-granting service 20 provides the accumulator change value ACV and the public information $PK'_{SS}$ that comprises a public key $PK_{SS}$ for verifying the initial credential CRu(SS) and the accumulator value v. It is also possible that the accumulator change value ACV is distributed from the credential-granting service 20 directly.

The next time the users wants to access the entity 30, the derived-credential information ♥CRu'(SS,IV) is updated in that the present accumulator change value ACV is used to form a new indication value IV and therefrom a new indication-value information ♥IV. By doing so it can be guaranteed that the entity 30 allows the access because the user 10 can prove to be currently a valid user.

A user whose credential key $PK_U$ is not inherently included in the accumulator value v or has been deleted cannot form a new indication value IV that is valid.

Figure 2:
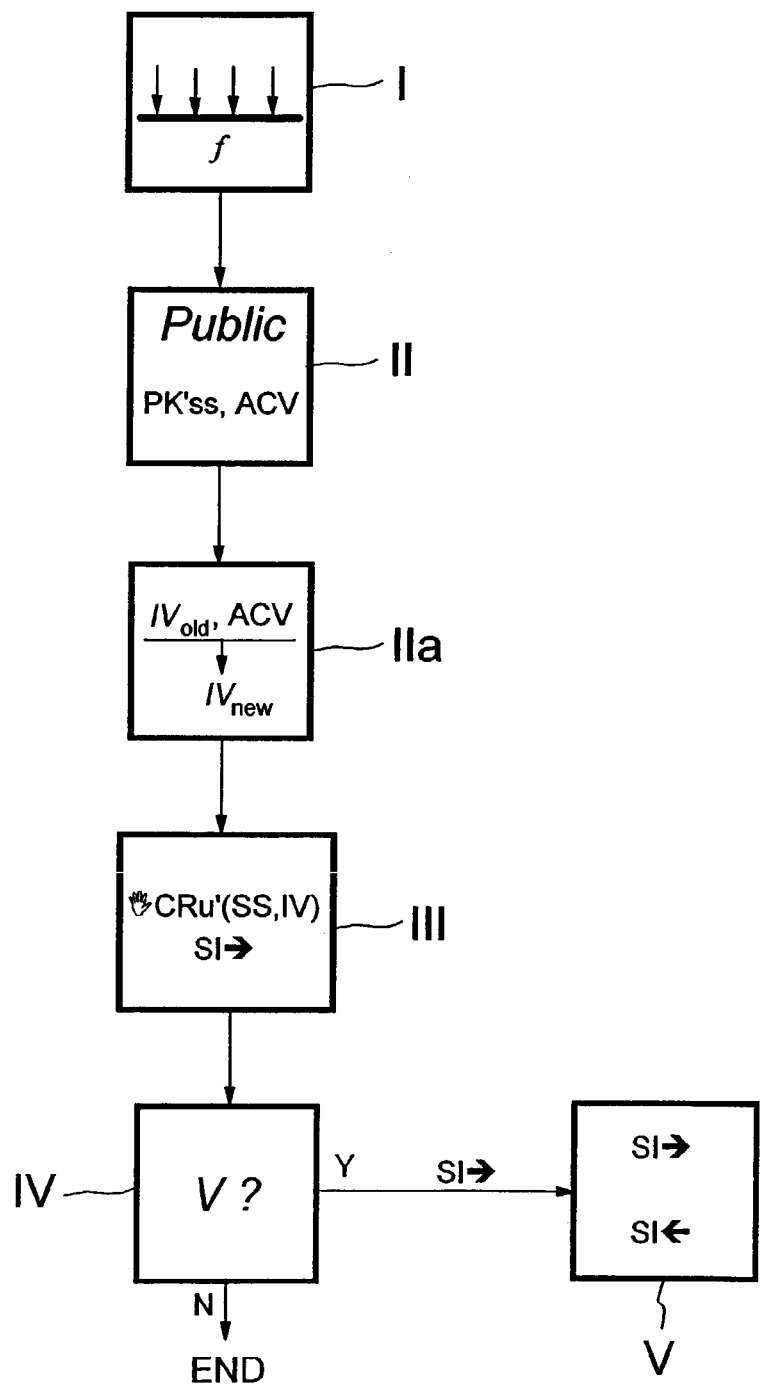
FIG. 2 shows a flow diagram according to the present invention.

FIG. 2 shows a general flow diagram according to the present invention in which the steps, indicated in boxes, are labeled with roman numbers, respectively. The same reference numerals or signs are used to denote the same or like parts.

I The accumulator value v is updated frequently, i.e. in defined time intervals but usually only if users were added or deleted. This can be up to several times a day or an hour, depending on the updating needs. The accumulator value v includes inherently a plurality of user credential keys $PK_{Ux}$ where each user credential key $PK_U$ belongs to at least one user 10 eligible to the derived credential CRu'(SS,IV). The update is performed by replacing the accumulator value v by an updated accumulator value v'. The updated accumulator value v' includes currently valid user credential keys $PK_{Ux}$ and therefore only currently valid users 10.

II In this step the accumulator change value ACV and the public information $PK'_{SS}$ comprising the public key $PK_{SS}$ for verifying the initial credential CRu(SS) and the accumulator value v is provided to the public.

IIa The users can update the derived-credential information ♥CRu'(SS,IV) in that the present accumulator change value ACV is used to form a new indication value IV, labeled with $IV_{new}$, and therefrom a new indication-value information ♥IV.

III The entity 30 receives from the user 10 the user request 12 which comprises the derived-credential information ↻CRu'(SS,IV) and request information SI→. The derived-credential information ↻CRu'(SS,IV) indicates that the user credential key $PK_U$ is inherently included in the accumulator value v.

IV The initial-credential information ↻CRu(SS) and the indication-value information ↻IV are verified about their validity. If the initial-credential information ↻CRu(SS) and the indication-value information ↻IV are valid, then, as indicated by Y (yes), the request information SI→ is further processed, as shown in box V. Otherwise the process stops as indicated by N (no). The response-service information SI← can be provided.

In accordance with the present invention, the accumulator $f$, also referred to as one-way accumulator, is applied to provide the accumulator value v or the updated accumulator value v'. Some basics, properties, and the constructions thereof are addressed in the following.

Accumulators

A secure accumulator, herein also referred to as accumulator $f$, for a family of inputs $\{X_k\}$ is a family of functions $\{F_k\}$ with the following properties:

Efficient generation There is an efficient probabilistic algorithm G that on input $1^k$ produces a random element $f$ of $F_k$. Moreover, along with $f$, G also outputs some auxiliary information about $f$, denoted $a_f$.

Efficient evaluation $f \in F_k$ is a polynomial-size circuit $f: U_f \times X_k \mapsto U_f$, where $U_f$ is an efficiently-samplable input domain for the function $f$.

Accumulation For all k, for all $f \in F_k$, for all $u \in U_f$, for all $x_1, x_2 \in X_k$,
$f(f(u, x_1), x_2) = f(f(u, x_2), x_1)$. If $X = \{x_1, \ldots, x_m\} \subset X_k$, then by $f(u, X)$ is denoted $f(f(\ldots(u, x_1), \ldots)x_m)$.

Efficient update of accumulator value v: There exist efficient algorithms to add and delete. Adding a value $\tilde{x} \in X_k$ to the accumulator value v can efficiently be done by computing $v' = f(v, \tilde{x})$. Efficiently deleting uses a delete algorithm D such that, if $X \subset X$, $v = f(u, X)$, then $D(a_f, v, x) = v'$, such that if $x \in X$ then $v' = f(X \setminus x, u)$. Note that D does not take the set X as input.

Efficient update of indication value IV: After the accumulator value v has been updated the indication value IV is updated, where u denotes an old indication value and u' a new indication value. Let u be the indication value as a kind of witness that x is included in the accumulator value v. If $\tilde{x}$ was added to the accumulator value v, i.e., $v' = f(v, \tilde{x})$, then $u' = f(u, \tilde{x})$ is the new indication value that x is accumulated in v'. Efficiently updating the witness after the deletion uses an efficient algorithm E such that for all $f$, if $v = f(u, x)$ and $v' = D(a_f, v, \tilde{x})$, then $E(u, x, \tilde{x}, v, v') = u'$ such that $v' = f(u', x)$.

Collision-resistance For all probabilistic polynomial-time adversaries $A_k$, the probability that $x' \notin X$ and $f(u', x') = f(u, X)$ holds for (u', x') output by $A_k$ on input $f$, $U_f$, u, and X, where $f$ is chosen randomly by $G(1)^k$, $X = (X_1, \ldots, X_m)$ is chosen at random from $(X_k)^m$, u is chosen randomly from $U_f$, is negligible in k.

Only the legitimate accumulated values, $(x_1, \ldots, x_m)$, belong to $X_k$; the forged value x' can be any string, as long as the function $f$ is defined for this string.

An efficiently provable collision-resistant accumulator with respect to a commitment scheme (Commit, Reveal) is a collision-resistant accumulator with the following additional property:

There exists an efficient zero-knowledge proof of knowledge system where the common inputs are c (where (c, r)=Commit(x)), the accumulating function $f$ and $v \in U_f$, and the prover's inputs are (r, $x \in X_k$, $u \in U_f$) for proving knowledge of x, u, r such that (c, r)=Commit(x) and v=$f$(u, x).

If by "efficient" is meant "polynomial-time," then any accumulator satisfies this property.

Construction

The domain of the accumulated values to the accumulator OAW comprises substantially prime numbers. Credential keys belonging to user devices 10 can be deleted efficiently and an update can be proofed.

$X_k$ is the set of prime integers between $2^k$ and $2^{k+1}-1$.

$F_k$ is the family of functions that correspond to exponentiating modulo safe-prime products drawn with security parameter k. Choosing $f \in F_k$ amounts to choosing a modulus n=pq, where p=2p'+1, q=2q'+1, and p, p', q, q' are all prime. It is denoted $f$ corresponding to modulus n and security parameter k by $f_{n, k}$. For technical reasons, $f_{n, k}$ is undefined for all integers that do not fall into the interval between $2^k$ and $2^{k+1}-1$. It is denoted $f_{n, k}$ by $f_n$ and by $f$ when it does not cause confusion.

For $f = f_{n, k}$, the auxiliary information $a_f$ is the factorization of n.

For $f = f_{n, k}$, $U_f = QR(n)$.

Delete: $D(a_f, v, x) = v^{1/x} \mod n$.

Update after delete: Suppose $x \neq \tilde{x} \in X_k$. Then by an extended Greatest Common Divisor (GCD) algorithm, one can compute the integers a, b such that $ax+b\tilde{x}=1$. Then $$u' = E(u, x, \tilde{x}, v, v') = u^b(v')^a.$$

The verification that $f(u', x) = (u')^x \mod n = v'$ is as follows:

$$(u^b(v')^a)^x =$$

$$((u^b(v')^a)^{x\tilde{x}})^{1/\tilde{x}} =$$

$$(((u^x)^{b\tilde{x}}((v')^{\tilde{x}})^{ax}))^{1/\tilde{x}} =$$

$$(v^{b\tilde{x}}v^{ax})^{1/\tilde{x}} = v^{1/\tilde{x}} = v'$$

Figure 3:
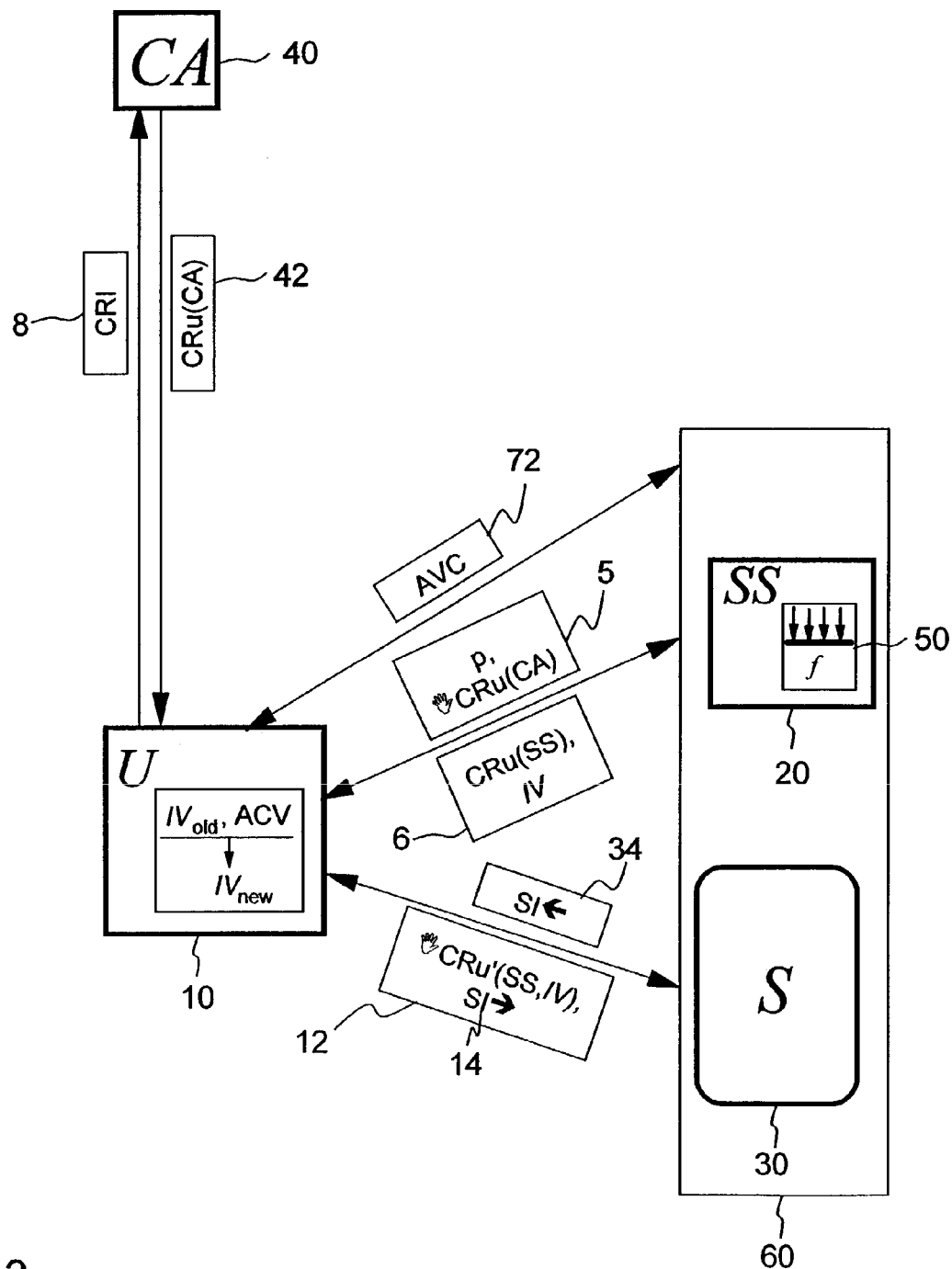
FIG. 3 shows a schematic illustration of a second embodiment wherein a registration service is involved.

FIG. 3 shows a schematic illustration of a second embodiment wherein a registration service is involved. Moreover, a specific pseudonym system is applied. The same reference numerals or signs are used to denote the same or like parts.

The structure of this embodiment is generally similar to the embodiment described with reference to FIG. 1 and only the key differences will be described here. Firstly, as illustrated in the figure, the credential-granting service 20 and the entity 30 form an unitary service entity 60. The user 10 obtains the accumulator change value 72 directly from the unitary service entity 60. A further notable difference here is that a registration service 40, labeled with CA, is involved. This registration service 40 can be a certification authority. Furthermore, the registration service 40 can be integrated in the unitary service entity 60, but here the registration service 40 is an external or separate entity as depicted in the figure. The user 10 connects to the registration service 40 by sending a credential request information 8, labeled with CRI. In answer to it, the user 10 receives a registration information, which comprise a root pseudonymous credential 42, labeled and indicated with CRu (CA), from the registration service 40. The root pseudonymous credential 42 can be an anonymous or pseudonymous credential 42. Such anonymous or pseudonymous credentials 42 useable with the entity 30 can be realized using different possible pseudonym systems. Depending on which pseudonym system used, implementation aspects as well as security/anonymity features may change.

The following describes a possible realization of an anonymity service, such as the entity 30, using a provably secure pseudonym system such as described by J. Camenisch and A. Lysyanskaya in their article "Efficient non-transferable anonymous multi-show credential system with optional anonymity revocation" in Birgit Pfitzmann, editor, Advances in Cryptology—EUROCRYPT 2001, volume 2045 of LNCS, pages 93-118, Springer Verlag, 2001. In a chosen pseudonym system, the pseudonym system's certification authority, i.e. the registration service 40, registers users or the user 10 to the pseudonym system by issuing them with the root pseudonymous credential 42, as indicated by the arrow and box labeled with CRu(CA). The user 10 sends to the unitary service entity 60 a message comprising the root pseudonymous credential information ʊCRu(CA) together with the payment as indicated by box 5, labeled with p, ʊCRu(CA). The unitary service entity 60, and in particular the credential-granting service 20 as part of the unitary service entity 60, issues then the access information 6 which here comprises the initial credential CRu(SS) and the indication value IV. The further messages are those as described above.

In the above chosen pseudonym system, showing a credential e.g. providing the derived-credential information ʊCRu'(SS,IV), is not linkable to what was seen by the issuing party, i.e. the registration service 40 or the credential-granting service 20. As an example, even if the registration service 40 and the unitary service entity 60 with its credential-granting service 20 and the entity 30 cooperate and exchange information, they are not able to link a request for information, i.e. the user request 12, to a user 10 registered with the registration service 40, or to data collected by these entities and services during the issuing of the root pseudonymous credential 42, i.e. CRu(CA), or the initial credential CRu(SS).

As a result, even if the registration service 40 and the unitary service entity 60 with its credential-granting service 20 and the entity 30 are implemented as part of one entity (e.g., by one company for example), the user 10 need not trust this company in order to be convinced of his total anonymity when accessing the entity 30.

The present method can also be applied to group signatures and credential systems as described in the following.

In the article of G. Ateniese et al. "A practical and provably secure coalition-resistant group signature scheme", in Mihir Bellare, editor, Advances in Cryptology-CRYPTO 2000, volume 1880 of LNCS, pages 255-270. Springer Verlag, 2000, a group manager has a public key PK, consisting of a number N, which is a product of two safe primes, and the values a, b, g, and h which are quadratic residues modulo N. A user 10, hereafter called user $U_i$, has a membership certificate comprising a user's secret $x_i$ selected jointly by the user $U_i$ and the group manager from an appropriate integer range and the values $z_i$ and $e_i$, where $e_i$ is a prime number selected from an appropriate range, and $z_i^{e_i}=a^{x_i}b$ mod N. When the user $U_i$ proves his membership in a group, he effectively proves knowledge of a membership certificate (x, z, e). (This is what the elements g and h of the public key PK are used for).

The credential system, presented by J. Camenisch and A. Lysyanskaya in their article "Efficient non-transferable anonymous multi-show credential system with optional anonymity revocation" In Birgit Pfitzmann, editor, Advances in Cryptology—EUROCRYPT 2001, volume 2045 of LNCS, pages 93-118, Springer Verlag, 2001, shows a similar construction. An organization's public key consists of a number N, which is a product of two safe primes, and the values a, b, c, g, and h which are all quadratic residues modulo N. The user $U_i$'s secret key $x_i$, selected from an appropriate integer range, is incorporated into all of the user $U_i$'s credentials. A credential tuple for the user $U_i$ comprises his secret key $x_i$, a secret value $s_i$ selected jointly by the user $U_i$ and the organization (via a secure computation which ensures secrecy for the user $U_i$) from an appropriate integer range, and the values $z_i$ and $e_i$ such that $e_i$ is a prime number selected by the organization from an appropriate integer interval, and $z_i$ is such that $z_i^{e_i}=a^{x_i}b^{s_i}c$ mod N. Proving possession of a credential is effectively a proof of knowledge of a credential tuple.

Variations of these schemes incorporate such features as anonymity revocation, non-transferability, one-show credentials, expiration dates, and appointed verifiers. For all these variations, an integral part of a group membership certificate and of a credential, is the prime number $e_i$. Using accumulators f one can accumulate $e_i$'s into a single public value, i.e. the accumulator value v. Proof of group membership will now have to include proof of knowledge of a witness to the fact that $e_i$ was accumulated into the accumulator value v.

To take advantage of certificate revocation, the following adaptation should be made to the usual group signature operations.

Modifications to the group manager's operations:

Setup: In addition to setting up the group signature scheme, the group manager creates the public modulus n for the accumulator $f$, chooses a random $U \in QR(n)$ and publishes (n, u). Set up archives $E_{add}$ for storing values that correspond to added users and $E_{delete}$ for storing values that correspond to deleted users.

Add a user: Issue the user's membership certificate, as in the group signature scheme. Add the current u to the user's membership certificate. (Denote it by $u_i$.) Let $e_i$ be the prime number used in this certificate. Updates the public information $PK'_{SS}$ v: $v':=f_n(v, e_i)$. Update $E_{add}$: store $e_i$ there.

Delete a user: Retrieve $e_i$ which is the prime number corresponding to the user's membership certificate. Update v: $v':=D(\phi(n), v, e_i)$. Update $E_{delete}$: store $e_i$ there.

Join: Store the value $u_i$ along with the rest of the membership certificate.

Verify that $f_n(u_i, e_i)=u_i^{e_i}=v$.

Update: An entry in the archive is called "new" if it was entered after the last time $U_i$ performed an update.

1. Let y denote the old value of v.
2. For all new $e_j \in E_{add}$, $u_i:=f_n(u_i, \Pi e_j)=u_i^{\Pi e_j}$; $y=f(y,\Pi e_j)=y^{\Pi e_j}$.
3. For all new $e_j \in E_{delete}$, $u_i:=E(u_i, e_i, \Pi e_j, y, u)$.

As the result $v=f(u_i, e_i)$ holds.

Any disclosed embodiment may be combined with one or several of the other embodiments shown and/or described. This is also possible for one or more features of the embodiments.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for revocation of a derived credential formed from an initial credential and an indication value at a credential-granting service, the method comprising
    creating an archive at the credential-granting service for storage of prime number values that are associated with membership certificates of respective user devices whose credentials have been revoked;
    identifying a user device whose privileges are to be revoked;
    retrieving the prime number value that is associated with the membership certificate of the identified user device;
    updating an accumulator value utilizing the retrieved prime number value; and
    storing the retrieved prime number value at the archive dedicated to the storage of prime number values that are associated with user devices whose credentials have been revoked.

2. The method of claim 1, further comprising connecting the user device to the credential-granting service by sending activation information from the credential-granting service to the user device in order to obtain a credential, the activation information comprising an initial credential and an indication value.

3. The method of claim 2, wherein updating the accumulator value comprises replacing the accumulator value by an updated accumulator value provided by the credential-granting service, the updated accumulator value including currently valid user credential keys.

4. A system for provision and revocation of derived credentials formed from initial credential and indication values within a network, the system comprising:
    a user device connectable to a credential-granting service and an entity, the credential-granting service having an update unit for an accumulator value based on a plurality of user credential keys where each user credential key is associated with one user device entitled to the derived credentials, the credential-granting service providing public information having a public key for verifying the initial credential and the accumulator value wherein the update unit is adapted to update the accumulator value by an accumulator so as to include currently valid user credential keys, and
    the credential-granting service comprising an archive for storage of prime number values that are associated with membership certificates of respective user-device's whose credentials have been revoked, where in the event of the revocation of a user-device's membership certificate the credential-granting service is further responsible for retrieving the prime number value that is associated with the membership certificate of an identified user device and updating the accumulator value utilizing the retrieved prime number value and storing the retrieved prime number value at the archive.

5. The system according to claim 4, wherein the entity and the credential-granting service are integrated in a unitary entity.

6. The system of claim 4, wherein the user device is adapted to send a derived-credential information comprising an initial-credential information and an indication-value information indicating that the user credential key is inherently included in the accumulator value, and request information.

7. The system of claim 6, wherein the entity is adapted to process the request information in response to a verification that the initial-credential information and the indication-value information are valid.

8. A system that comprises a provider, the provider being utilized for the provision and revocation of derived credentials that have been formed from initial credential and indication values within a network, the provider further comprising:
    a user device connectable to a credential-granting service and an entity, the credential-granting service having an update unit for an accumulator value based on a plurality of user credential keys where each user credential key is associated with one user device entitled to the derived credential, the credential-granting service providing public information having a public key for verifying the initial credential and the accumulator value, wherein:
        the update unit is adapted to update the accumulator value by an accumulator so as to include currently valid user credential keys, where in the event of the revocation of a user-device's membership certificate the update unit is further responsible for retrieving a prime number value that is associated with the membership certificate of an identified user device and updating the accumulator value utilizing the retrieved prime number value.

9. A computer program product that includes a computer readable medium useable by a processor, the medium having stored thereon a sequence of instructions which, when executed by the processor, causes the processor to revoke a derived credential formed from an initial credential and an indication value within credential-granting service, by:

creating an archive at a credential-granting service for storage of prime number values that are associated with the membership certificates of respective user devices whose derived credentials have been revoked;

identifying a user device whose privileges are to be revoked;

retrieving the prime number value that is associated with the membership certificate of the identified user device;

updating an accumulator value utilizing the retrieved prime number value;

and storing the retrieved prime number value at the archive.

* * * * *